(12) United States Patent
Fordyce

(10) Patent No.: US 10,966,508 B2
(45) Date of Patent: Apr. 6, 2021

(54) CAMPING UTENSIL SUPPORT APPARATUS

(71) Applicant: Dale Fordyce, Chesterfield, MI (US)

(72) Inventor: Dale Fordyce, Chesterfield, MI (US)

( * ) Notice: Subject to any disclaimer, the term of this patent is extended or adjusted under 35 U.S.C. 154(b) by 47 days.

(21) Appl. No.: 16/507,634

(22) Filed: Jul. 10, 2019

(65) Prior Publication Data

US 2021/0007470 A1     Jan. 14, 2021

(51) Int. Cl.
    *F16M 11/00*     (2006.01)
    *A45F 3/44*     (2006.01)
    *A47J 47/16*     (2006.01)

(52) U.S. Cl.
    CPC ............ *A45F 3/44* (2013.01); *A47J 47/16* (2013.01)

(58) Field of Classification Search
CPC ...... A47F 7/283; A47J 37/0763; F16M 13/02; A45F 3/00; A45F 3/44
See application file for complete search history.

(56) References Cited

U.S. PATENT DOCUMENTS

| | | | |
|---|---|---|---|
| 670,144 A * | 3/1901 | Bond | |
| 1,414,771 A * | 5/1922 | Cantleberry | A47J 33/00 248/125.1 |
| 2,123,595 A | 7/1938 | Elmer | |
| 2,227,941 A * | 1/1941 | Magidson | A44B 9/14 24/710.2 |
| 3,771,665 A | 11/1973 | Potter | |
| 4,096,951 A | 6/1978 | Menssen | |
| 5,127,528 A * | 7/1992 | Cone | A47B 96/1425 211/163 |
| 6,732,985 B1 | 5/2004 | Cantrell | |
| 6,736,358 B2 | 5/2004 | Johnson | |
| 7,080,811 B2 | 7/2006 | Thompson | |
| D675,884 S | 2/2013 | Dalling | |
| 10,729,226 B1 * | 8/2020 | Zamora | A45F 3/44 |
| 2002/0166928 A1 * | 11/2002 | Johnson | F16M 13/022 248/125.3 |

* cited by examiner

*Primary Examiner* — Amy J. Sterling

(57) ABSTRACT

A camping utensil support apparatus for keeping utensils off the ground near a campfire includes a bottom pole having a bottom shaft terminating at a spiked tip. A main pole is coupled to the bottom pole and has an open bottom side, a main sidewall, and a capped top side. The main sidewall has a pin aperture extending therethrough and the bottom pole is telescopingly engageable through the open bottom side between a compacted position with a lower through hole aligned with the pin aperture and an alternate extended position with an upper through hole aligned with the pin aperture. A spring clip is coupled through the pin aperture of the main pole to maintain the apparatus in the compacted position or the extended position, respectively. A plurality of pegs is coupled to the main pole and is configured to secure a plurality of eating and cooking utensils.

7 Claims, 5 Drawing Sheets

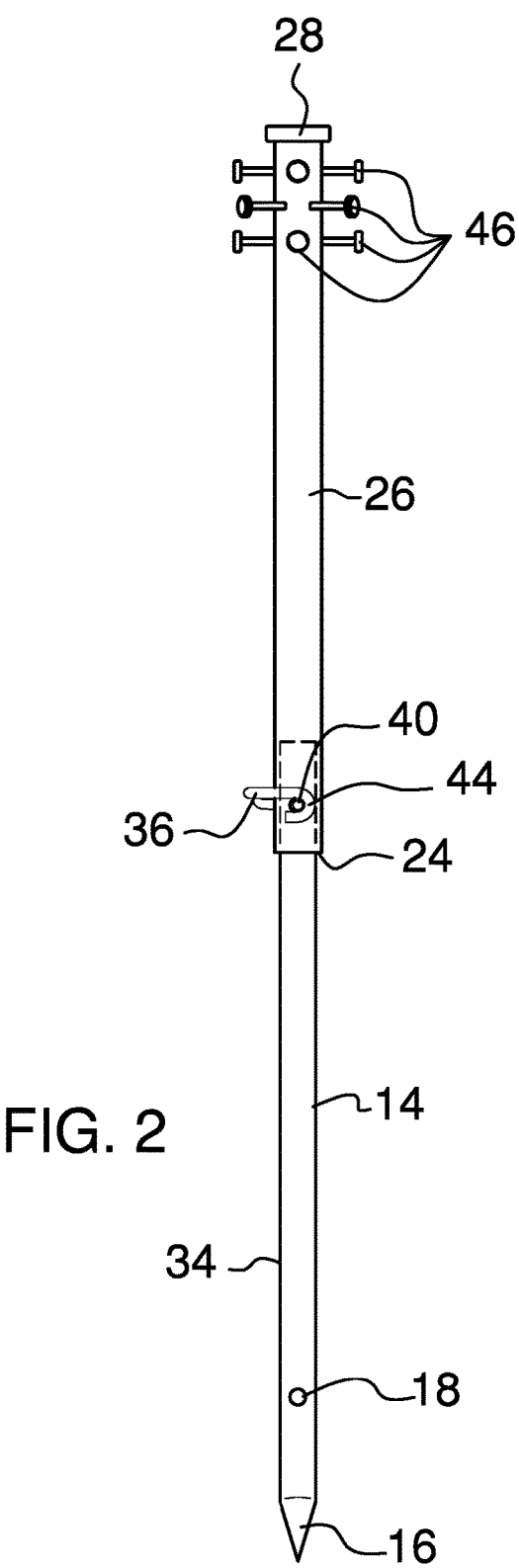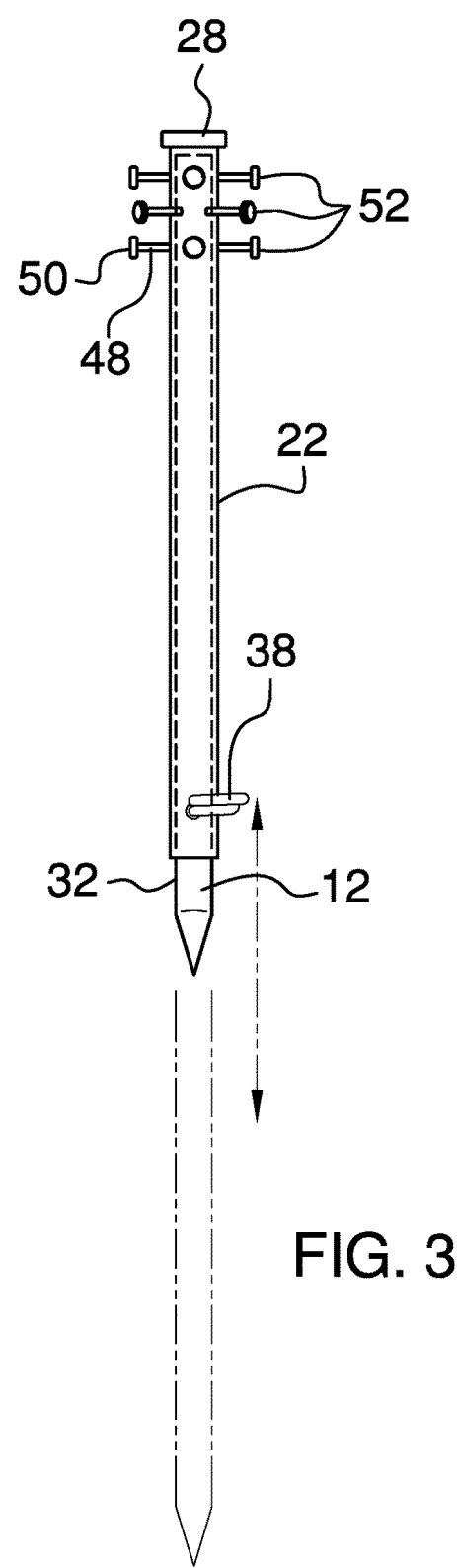

CAMPING UTENSIL SUPPORT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to camping tool and more particularly pertains to a new camping tool for keeping utensils off the ground near a campfire.

BRIEF SUMMARY OF THE INVENTION

An embodiment of the disclosure meets the needs presented above by generally comprising a bottom pole having a bottom shaft terminating at a spiked tip. The bottom shaft has a lower through hole and an upper through hole extending therethrough. A main pole is coupled to the bottom pole. The main pole has an open bottom side, a main sidewall, and a capped top side. The main sidewall has a pin aperture extending therethrough proximal the open bottom side. The bottom pole is telescopingly engageable through the open bottom side within the main sidewall between a compacted position with the lower through hole aligned with the pin aperture and an alternate extended position with the upper through hole aligned with the pin aperture. A spring clip is coupled through the pin aperture of the main pole and either the lower through hole or the upper through hole to maintain the apparatus in the compacted position or the extended position, respectively. A plurality of pegs is coupled to the main pole. Each of the plurality of pegs perpendicularly extends from the main sidewall. The plurality of pegs is configured to secure a plurality of eating and cooking utensils.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a front elevation view of an embodiment of the disclosure.

FIG. 3 is a rear elevation view of an embodiment of the disclosure.

DETAILED DESCRIPTION OF THE INVENTION

Figure 1:
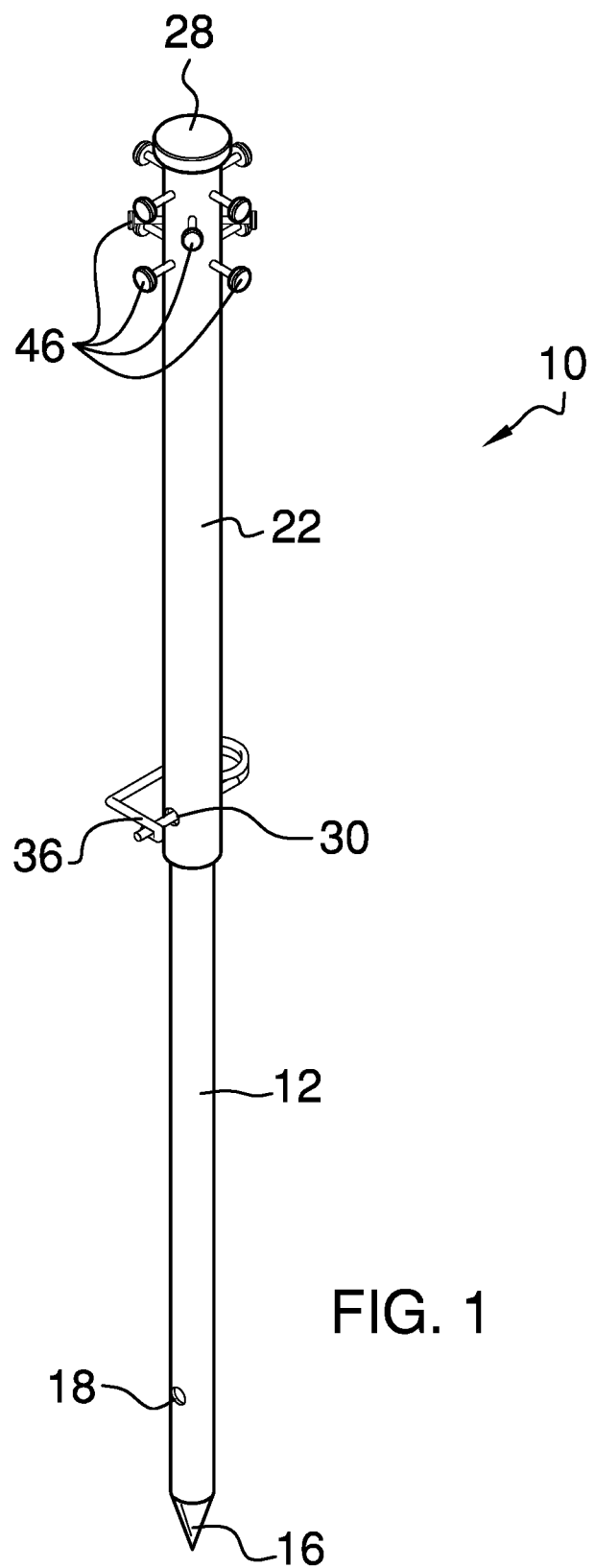
FIG. 1 is an isometric view of a camping utensil support apparatus according to an embodiment of the disclosure.
Figure 4:
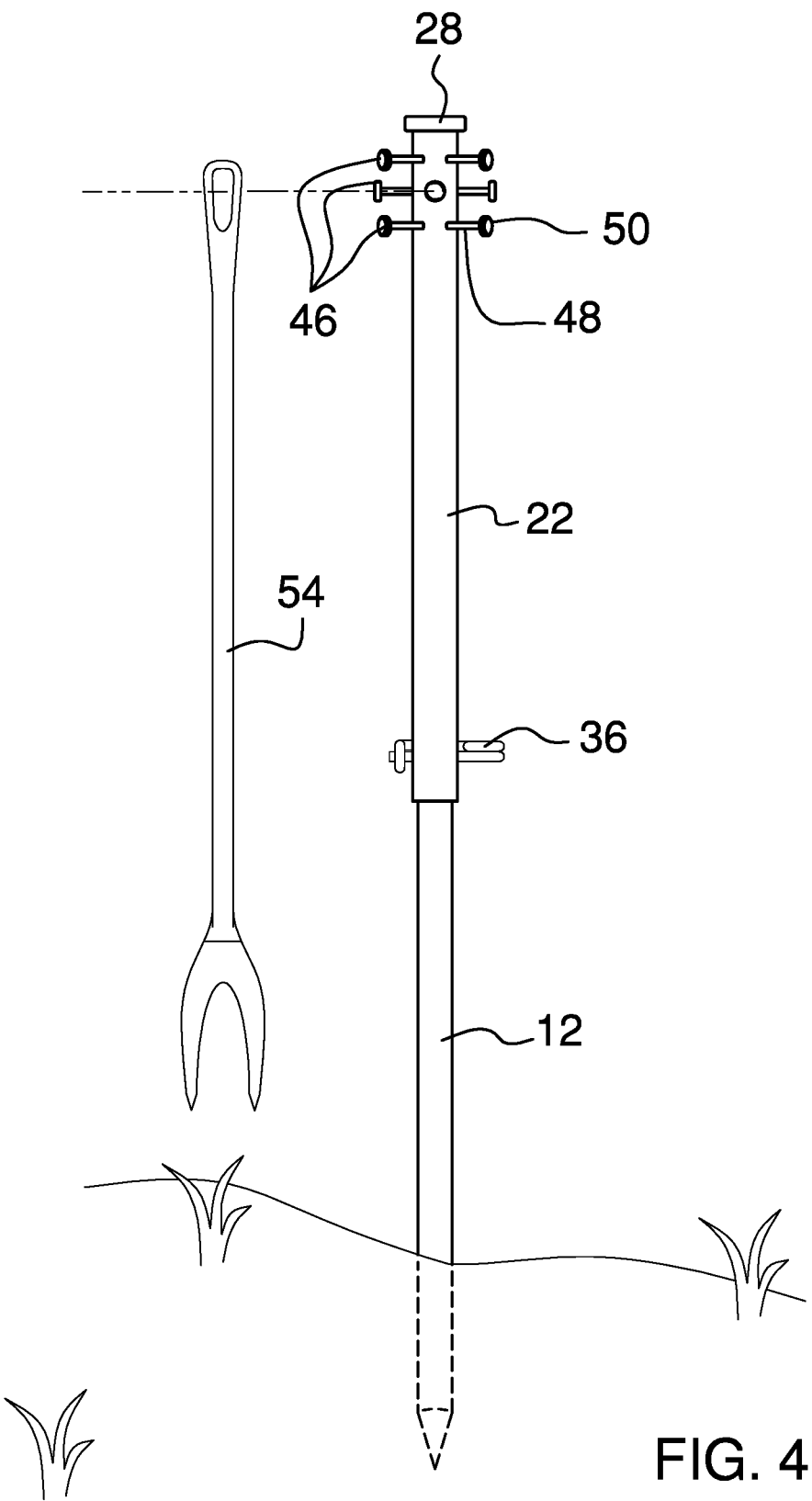
FIG. 4 is an in-use view of an embodiment of the disclosure.
Figure 5:
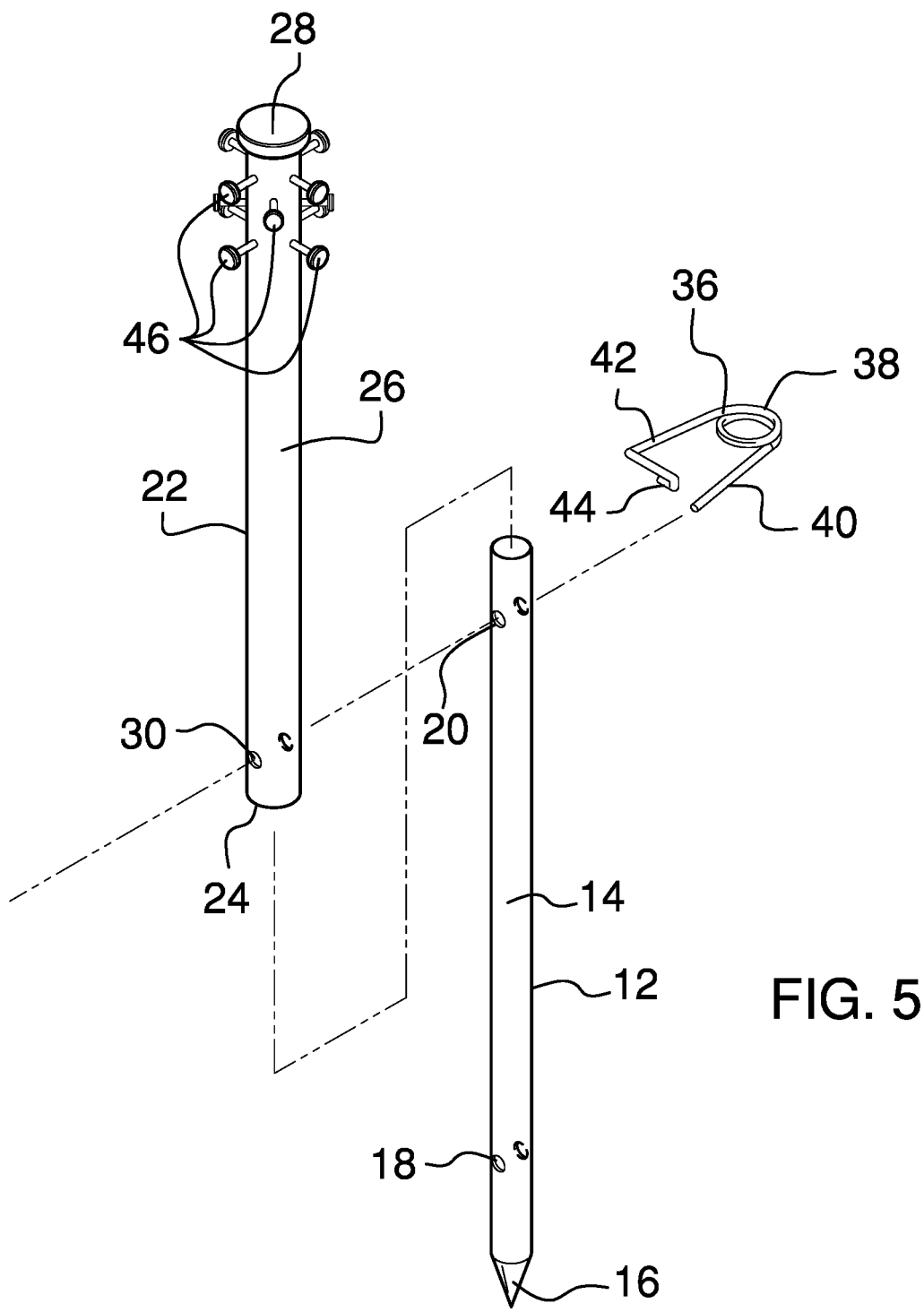
FIG. 5 is an exploded isometric view of an embodiment of the disclosure.
Figure 6:
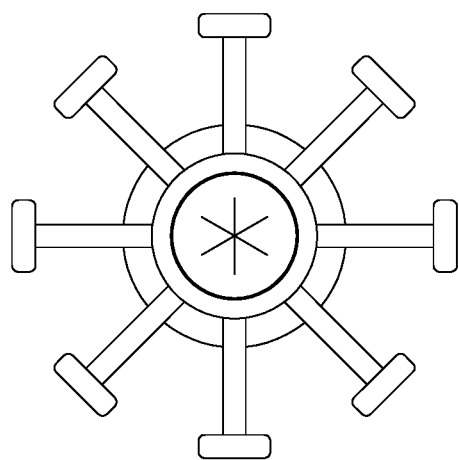
FIG. 6 is a bottom plan view of an embodiment of the disclosure.

With reference now to the drawings, and in particular to FIGS. 1 through 6 thereof, a new camping tool embodying the principles and concepts of an embodiment of the disclosure and generally designated by the reference numeral 10 will be described.

As best illustrated in FIGS. 1 through 6, the camping utensil support apparatus 10 generally comprises a bottom pole 12 having a bottom shaft 14 terminating at a spiked tip 16. The bottom shaft 14 has a lower through hole 18 and an upper through hole 20 extending therethrough. A main pole 22 is coupled to the bottom pole 12. The main pole 22 has an open bottom side 24, a main sidewall 26, and a capped top side 28. The capped top side 18 has a diameter greater than a diameter of the main sidewall 26. The main sidewall 26 has a pin aperture 30 extending therethrough proximal the open bottom side 24. The bottom pole 12 is telescopingly engageable through the open bottom side 24 within the main sidewall 26 between a compacted position 32 with the lower through hole 18 aligned with the pin aperture 30 and an alternate extended position 34 with the upper through hole 20 aligned with the pin aperture 30.

A spring clip 36 is coupled to the main pole 22. The spring clip 36 is coupled through the pin aperture 30 of the main pole and either the lower through hole 18 or the upper through hole 20 to maintain the apparatus 10 in the compacted position 32 or the extended position 34, respectively. The spring clip 36 comprises a coiled portion 38, a through portion 40 extending straight from the coiled portion 38, and an elbow portion 42 extending from the coiled portion 38. A distal end 44 of the elbow portion 42 is hooked and selectively engageable with the through portion 40 once passed through the pin aperture 30 of the main pole and either the lower through hole 18 or the upper through hole 20 of the bottom pole.

A plurality of pegs 46 is coupled to the main pole 22. Each of the plurality of pegs 46 has a thin portion 48 perpendicularly coupled to the main sidewall 26 proximal the capped top side 18 and a circular endcap 50 coupled to the thin portion 48. The plurality of pegs 46 is arranged in a plurality of tiers 52. Each tier 50 may comprise a set of four pegs 46 evenly spaced around the main sidewall 26. Each tier 50 may be radially offset by 45° from the adjacent tier 50. The plurality of pegs 46 is configured to secure a plurality of eating and cooking utensils 54.

In use, the spiked tip 16 is inserted into the ground near a campfire. The main pole 22 is moved to the extended position 34 and the spring clip 36 is engaged through the pin aperture 30 and the upper through hole 20. The utensils 54 may then be hung from the plurality of pegs 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A camping utensil support apparatus comprising:
    a bottom pole, the bottom pole having a bottom shaft terminating at a spiked tip, the bottom shaft having a lower through hole and an upper through hole extending therethrough;
    a main pole coupled to the bottom pole, the main pole having an open bottom side, a main sidewall, and a capped top side, the main sidewall having a pin aperture extending therethrough proximal the open bottom side, the bottom pole being telescopingly engageable through the open bottom side within the main sidewall between a compacted position with the lower through hole aligned with the pin aperture and an alternate extended position with the upper through hole aligned with the pin aperture;
    a spring clip coupled to the main pole, the spring clip being coupled through the pin aperture of the main pole and either the lower through hole or the upper through hole to maintain the apparatus in the compacted position or the extended position, respectively; and
    a plurality of pegs coupled to the main pole, each of the plurality of pegs perpendicularly extending from the main sidewall, the plurality of pegs being configured to secure a plurality of eating and cooking utensils, each peg of the plurality of pegs having a thin portion coupled fixedly to the main sidewall and a circular endcap coupled to the thin portion.

2. The camping utensil support apparatus of claim 1 further comprising the capped top side having a diameter greater than a diameter of the main sidewall.

3. The camping utensil support apparatus of claim 1 further comprising the plurality of pegs being coupled proximal the top side.

4. The camping utensil support apparatus of claim 1 further comprising the plurality of pegs comprising being arranged in a plurality of tiers, each tier comprising a set of four pegs evenly spaced around the main sidewall.

5. The camping utensil support apparatus of claim 4 further comprising each tier being radially offset by 45° from the adjacent tier.

6. The camping utensil support apparatus of claim 1 further comprising the spring clip comprising a coiled portion, a through portion extending straight from the coiled portion, and an elbow portion extending from the coiled portion, a distal end of the elbow portion being hooked and selectively engageable with the through portion once passed through the pin aperture of the main pole and either the lower through hole or the upper through hole of the bottom pole.

7. A camping utensil support apparatus comprising:
    a bottom pole, the bottom pole having a bottom shaft terminating at a spiked tip, the bottom shaft having a lower through hole and an upper through hole extending therethrough;
    a main pole coupled to the bottom pole, the main pole having an open bottom side, a main sidewall, and a capped top side, the capped top side having a diameter greater than a diameter of the main sidewall, the main sidewall having a pin aperture extending therethrough proximal the open bottom side, the bottom pole being telescopingly engageable through the open bottom side within the main sidewall between a compacted position with the lower through hole aligned with the pin aperture and an alternate extended position with the upper through hole aligned with the pin aperture;
    a spring clip coupled to the main pole, the spring clip being coupled through the pin aperture of the main pole and either the lower through hole or the upper through hole to maintain the apparatus in the compacted position or the extended position, respectively, the spring clip comprising a coiled portion, a through portion extending straight from the coiled portion, and an elbow portion extending from the coiled portion, a distal end of the elbow portion being hooked and selectively engageable with the through portion once passed through the pin aperture of the main pole and either the lower through hole or the upper through hole of the bottom pole; and
    a plurality of pegs coupled to the main pole, each of the plurality of pegs having a thin portion perpendicularly coupled fixedly to the main sidewall proximal the top side and a circular endcap coupled to the thin portion, the plurality of pegs comprising being arranged in a plurality of tiers, each tier comprising a set of four pegs evenly spaced around the main sidewall, each tier being radially offset by 45° from the adjacent tier, the plurality of pegs being configured to secure a plurality of eating and cooking utensils.

* * * * *